United States Patent [19]
Lee

[11] Patent Number: 5,798,891
[45] Date of Patent: Aug. 25, 1998

[54] ROTARY HEAD DRUM FOR A VCR HAVING RING SHAPED AND CIRCULAR MAGNETS

[75] Inventor: Sang-Jin Lee, Seoul, Rep. of Korea

[73] Assignee: Daewoo Electronics Co., Ltd, Rep. of Korea

[21] Appl. No.: 690,394

[22] Filed: Jul. 26, 1996

[30] Foreign Application Priority Data

Jul. 28, 1995 [KR] Rep. of Korea ............... 1995 22640
Jul. 28, 1995 [KR] Rep. of Korea ............... 1995 22641

[51] Int. Cl.$^6$ ................................................. G11B 5/52
[52] U.S. Cl. ................................................. 360/107
[58] Field of Search ......................... 360/107, 109, 360/103.24, 84

[56] References Cited

U.S. PATENT DOCUMENTS

| | | | |
|---|---|---|---|
| 4,603,359 | 7/1986 | Narasawa et al. | 360/84 |
| 4,930,030 | 5/1990 | Yabu | 360/107 |
| 4,972,283 | 11/1990 | Kim | 360/107 |
| 5,019,926 | 5/1991 | Van Thuijl et al. | 360/107 |
| 5,086,361 | 2/1992 | Kawada et al. | 360/107 |
| 5,287,341 | 2/1994 | Ozue et al. | 360/107 |
| 5,392,180 | 2/1995 | Hasegawa | 360/107 |

FOREIGN PATENT DOCUMENTS

56-51021  5/1981  Japan ...................... 360/107

*Primary Examiner*—Stuart S. Levy
*Assistant Examiner*—Brian E. Miller

[57] ABSTRACT

Disclosed is a rotary head drum for a VCR having an improved structure. A cylindrical lower drum and an upper drum installed on the lower drum and rotatably supported by the lower drum, are included. At least two video heads are provided at the outer lower portion of the upper drum for recording or playing a video signal onto or from a magnetic tape. Also, a lower rotary transducer is formed in an upper potion of the lower drum. An upper rotary transducer is positioned on the lower rotary transducer for transmitting an applied signal from the video head to the lower rotary transducer. A stator is positioned on the upper rotary transducer. The stator is transformed into an electromagnet according to an application of current. A ring-shaped magnet is provided in the upper drum at the same height as the stator. A circular magnet is formed above the stator and in the upper drum. Since the drum shaft insertion process is eliminated, the manufacturing of the head drum is advantageous. In addition, the noise generated during the operation of the head drum is reduced.

16 Claims, 6 Drawing Sheets

ROTARY HEAD DRUM FOR A VCR HAVING RING SHAPED AND CIRCULAR MAGNETS

BACKGROUND OF THE INVENTION

1. Field of the Invention

The present invention relates to a rotary head drum for a video cassette recorder (VCR), and more particularly to a rotary head drum for a VCR, which, since an upper drum can rotate without a drum shaft, can be manufactured without inserting a drum shaft into the head drum, so that the manufacturing process of the head drum is simplified and operation noise thereof is reduced.

2. Description of the Prior Art

Generally, a VCR is a device for recording an image and/or an audio signal onto a magnetic tape running along a running system or for reproducing recorded signals. The magnetic tape is wound on a pair of wheels provided in a cassette, and when the cassette is loaded into a deck of a tape recorder according to a loading mechanism, the pair of wheels are respectively mounted on a take-up reel and a supply reel installed on the deck. After completion of installation, tape drawing members draw the tape from the cassette positioned at a loading place so that the tape makes contact with about a half of the circumference of the head drum. After that, a selected running operation such as playing, recording, fast forwarding and rewinding is carried out. At this time, the magnetic tape is drawn out from a wheel and wound around the other wheel according to the rotational direction of the take-up wheel and the supply wheel.

Elements for carrying out the above-described VCR deck mechanism will be described in detail with reference to the attached FIG. 1.

In the front and upper portion of a main base 10, a supply reel 12 and a take-up reel 14 for running a wound tape in the forward or reverse direction according to the mode selected by a user and according to the driving direction of a capstan motor after loading a magnetic tape, are provided at the same central line at a predetermined distance apart from each other. On main base 10 between supply reel 12 and take-up reel 14, an idler device 16 for selectively being engaged with and rotating supply reel 12 and take-up reel 14, is installed.

In the rear and upper portion of the main base, a drum base 26 fixedly installed with a certain inclination is provided in the rear portion of supply reel 12, and a head drum 18 fixedly installed with the same inclination as the drum base, is provided on drum base 26. Guiding holes 20 and 21 having predetermined shapes are formed on main base 10 on the left side and the right side of head drum 18, that is, between supply reel 12 and head drum 18 and between take-up reel 14 and head drum 18, respectively. At the front portions of guiding holes 20 and 21, a supply side slant pole assembly 22 and a take-up side slant pole assembly is 24 are respectively provided. The slant pole assemblies draw the wound tape out when the cassette tape is loaded on supply reel 12 and take-up reel 14, and move along guiding holes 20 and 21 by a separate mechanical mechanism to the rear portion of head drum 18 so that the recording surface of the tape makes contact with the running surface on an upper drum 34 and a lower drum 28 which are elements of head drum 18.

FIG. 2 is a partial cross-sectional view for showing in detail the structure of the head drum illustrated in FIG. 1.

Lower drum 28, in which a lower rotary transformer 28a is formed, is provided. Under lower drum 28, a housing 30a having a drum motor 30 therein is installed. A ring-shaped magnet is attached to the inner circumference of housing 30a to form a rotor 30b. A stator 30c, which could be magnetized when a current is applied, is provided in the center portion of housing 30a. A drum motor 30 is positioned at the bottom center of housing 30a and the bottom of a drum shaft 30d is fixed to the drum motor. Drum shaft 30d rotates in a predetermined direction according to the electromagnetic power generated by rotor 30b and stator 30c. Upper drum 34 is positioned above lower drum 28. Upper drum 34 is inserted into the upper end portion of drum shaft 30d by applying pressure and is provided with a plurality of video heads 32 at the lower end portion thereof by means of screws 38 positioned at a predetermined distance apart from each other. Upper drum 34 rotates in a predetermined direction when drum shaft 30d rotates by the driving force of drum motor 30. At the outer circumference of drum shaft 30d corresponding to the inner portion of upper drum 34, a separate flange 34a is inserted by applying pressure, and at the lower end portion of flange 34a, an upper rotary transducer 34b is installed. Upper rotary transformer 34b is electrically connected with lower rotary transformer 28a which is within lower drum 28 and rotates while supplying image signals from video heads 32 to lower rotary transformer 28a.

A lot of reports on rotating head drums being inserted into drum shafts with pressure are widely known. See U.S. Pat. Nos. 5,392,180 (issued to Hasegawa), 4,972,283 (issued to Kim), 4,930,030 (issued to Yabu et al.), etc.

However, the rotation of the conventional head drum as described above is carried out by the drum shaft. Accordingly, the upper portion of the drum shaft should be inserted into the center portion of the upper drum during the manufacturing of the head drum. At this time, high precision and a great deal of skill are required to satisfy a rigid tolerance limit. This requires increased labors which deteriorates work efficiency and productivity. Moreover, since a lot of constituting elements should be assembled, work efficiency during assembling on the main base is poor. Further, since the upper drum rotates while being mechanically combined with the drum shaft, noise is generated during operation of the head drum after installation on the main base.

SUMMARY OF THE INVENTION

To solve the problems of the conventional art, it is an object of the present invention to provide a novel rotary head drum for a VCR which can rotate without a drum shaft, thereby simplifying a manufacturing process thereof by eliminating the insertion process of the drum shaft at an assembly line, preventing generation of operational noise, and improving work efficiency during the installation thereof on a main base.

To accomplish the above object of the present invention, there is provided a rotary head drum for a VCR comprising: a cylindrical lower drum; an upper drum installed on the lower drum and rotatably supported by the lower drum; at least two video heads provided at an outer lower portion of the upper drum for recording or playing a video signal onto or from a magnetic tape; a lower rotary transducer formed in an upper portion of the lower drum; an upper rotary transducer positioned on the lower rotary transducer for transmitting an applied signal from the video head to the lower rotary transducer; a stator positioned on the upper rotary transducer, the stator being transformed into an electromagnet according to an application of current; a ring-shaped magnet integrally formed in the upper drum at the same height as the stator; and a circular magnet formed above the stator and in the upper drum.

It is preferred that the ring-shaped magnet and the circular magnet are formed by alternately magnetizing N-pole and S-pole at a regular interval. and that the ring-shaped magnet and the circular magnet are installed such that opposite polarities of the magnets are vertically facing each other on the same line.

The stator is comprised of a ring-shaped base having a predetermined radius, a plurality of partitions for separating the periphery portion of the base at a regular interval, and a coil winding plate protrusively formed between the partitions for winding a coil.

At this time, an electric wire drawn out from a printed circuit board is connected to the base for supplying current to the coil on the coil winding plate.

Preferably, a circular supporting plate having a screw hole at the periphery portion thereof is integrally formed on the upper rotary transformer, and the video head is fixed by a screw between the circular supporting plate and the upper drum.

Fixing boss inserting holes are formed at the center portions of the stator, the circular supporting plate, the upper rotary transformer, the lower rotary transducer, and the lower drum, and a fixing boss having an electric wire inserting hole at the center thereof is inserted into all the fixing boss inserting holes.

The object of the present invention also can be accomplished by a rotary head drum for a VCR comprising: a cylindrical lower drum; an upper drum installed on the lower drum and rotatably supported by the lower drum; at least two video heads provided at an outer lower portion of the upper drum for recording or playing a video signal onto or from a magnetic tape; a lower rotary transformer formed in an upper potion of the lower drum; an upper rotary transformer positioned on the lower rotary transducer for transmitting an applied signal from the video head to the lower rotary transformer; a stator positioned on the upper rotary transformer, the stator being transformed into an electromagnet according to an application of current; a ring-shaped magnet integrally formed in the upper drum at the same height as the stator; a coil magnetic plate formed on the stator and controlled by a separate servo system; and a circular magnet formed above the stator and in the upper drum.

Particularly, a plurality of intaglio grooves are formed at the outer periphery of the coil magnet plate, and ring-shaped coils are inserted into the intaglio grooves. The ring-shaped coils can be transformed into electromagnets by current.

In the rotary head drum for a VCR according to the present invention, since an upper drum rotates not by a drum shaft, but by an electromagnetic force generated between a magnet and an electromagnet, the manufacturing process of the head drum can be simplified by eliminating an insertion process of the drum shaft into the upper drum. Further, work efficiency in assembling the head drum on a main base can be improved.

BRIEF DESCRIPTION OF THE DRAWINGS

The above object and advantages of the present invention will become more apparent by describing in detail preferred embodiments thereof with reference to the attached drawings, in which.

DETAILED DESCRIPTION OF THE INVENTION

Hereinafter, the constituting elements and the operation principle of the rotary head drum according to the preferred embodiments of the present invention will be explained in more detail with reference to the accompanying drawings.

Figure 1:
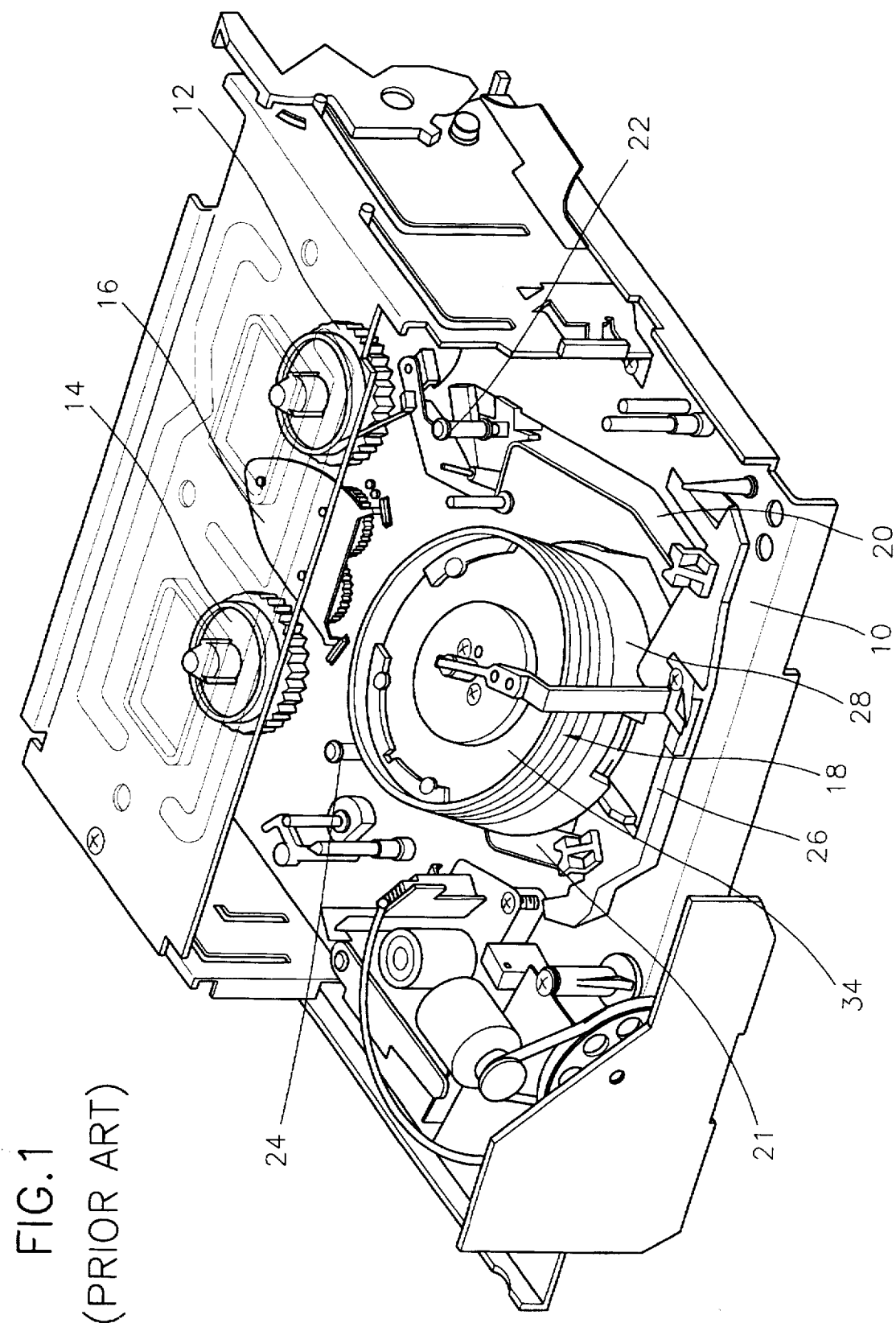
FIG. 1 is a perspective view for showing the inner structure of the conventional VCR.
Figure 2:
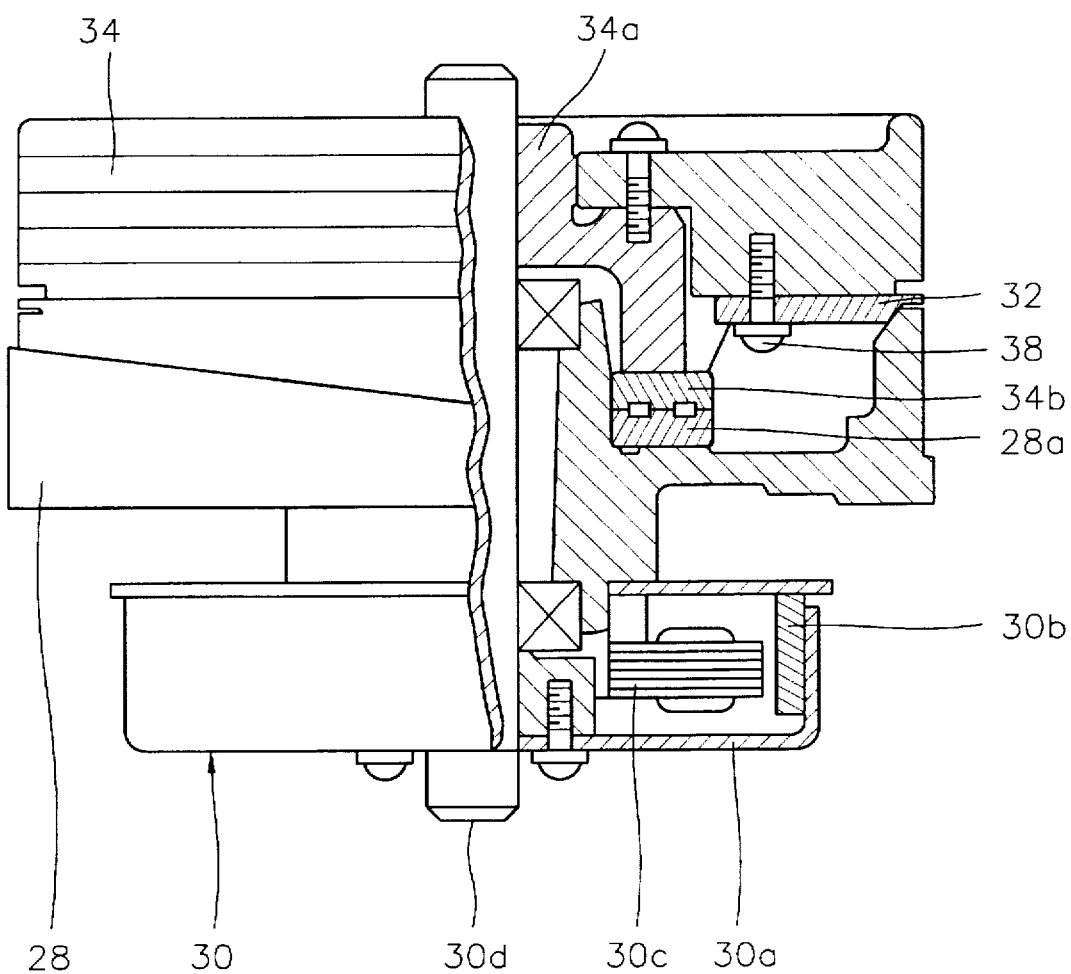
FIG. 2 is a partial cross-sectional view for showing in detail the structure of a rotary head drum in FIG. 1.
Figure 3:
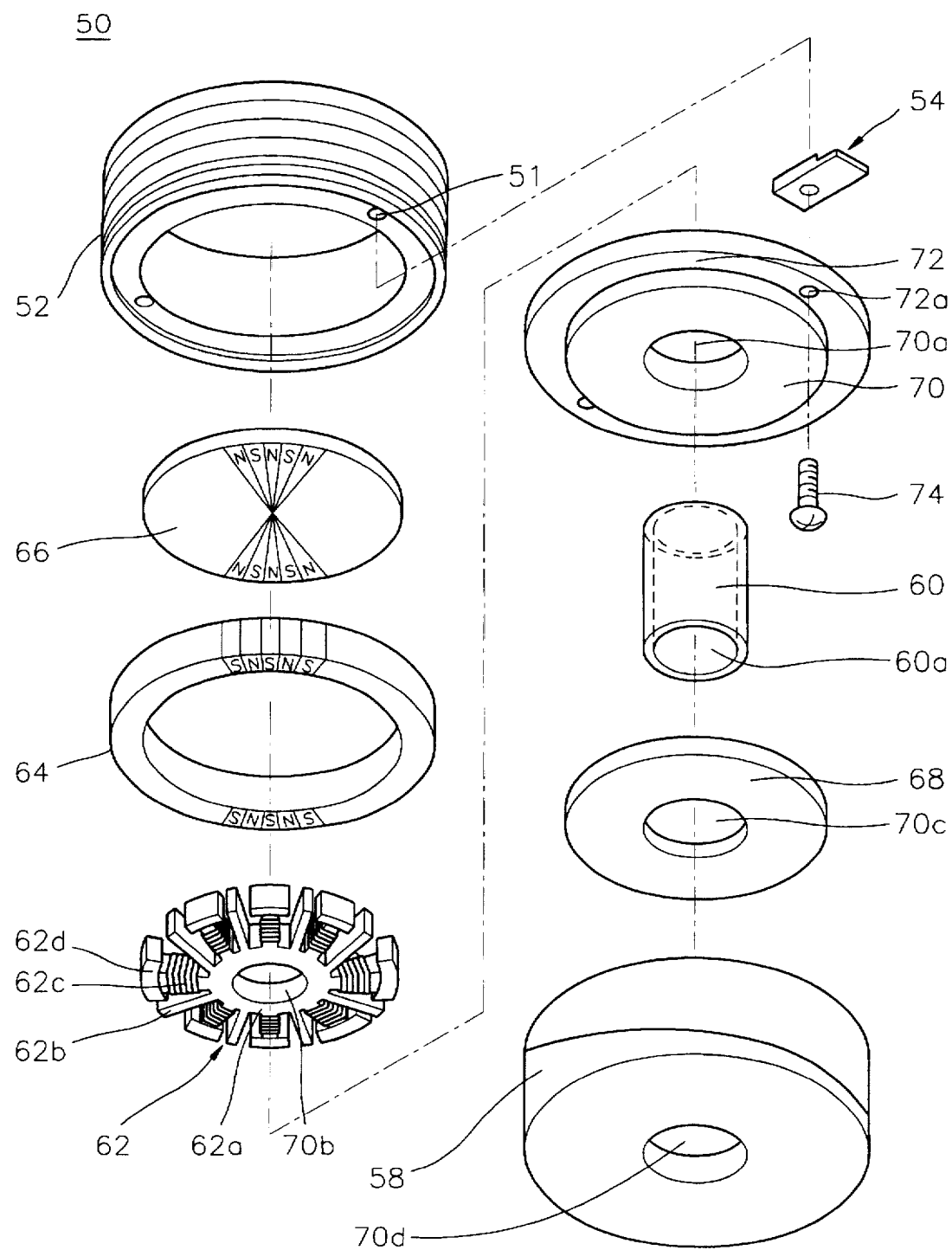
FIG. 3 is an exploded perspective view of a rotary head drum for a VCR according to an embodiment of the present invention.

FIG. 3 is an exploded perspective view of a rotary head drum for a VCR according to an embodiment of the present invention.

In the drawing, a head drum 50 is roughly provided with a cylindrical upper drum 52, a lower drum 58 which is positioned on the same vertical line as upper drum 52 so determines the installation position of the upper drum, and a plurality of video heads 54, which are formed at the end portions of upper drum 52 and positioned at a predetermined distance apart from each other.

On the upper portion of lower drum 58, a lower rotary transformer 68 is provided and at the lower portion of upper drum 52, an upper rotary transformer 70 for transmitting signals received from video head 54 to lower rotary transformer 68, is provided. Video head 54 is positioned on an outer periphery portion of a circular supporting plate 72. The video head is fixedly provided between circular supporting plate 72 and upper drum 52 by a screw 74, a screw hole 72a which is formed at the outer periphery portion of circular supporting plate 72 and a screw groove 51 formed at the bottom portion of upper drum 52.

Upper rotary transformer 70 is integrally formed under circular supporting plate 72. Upper rotary transformer 70 is electrically connected with video head 54 and lower rotary transformer 68 fixed on lower drum 58, while rotating with upper drum 52.

Between upper rotary transformer 70 and lower rotary transducer 68, a fixing boss 60 having an electric wire inserting hole 60a formed at the center thereof is positioned.

At the upper portion of circular supporting plate 72, a stator 62 which can be transformed into an electromagnet according to an application of current, is formed. And around stator 62, a ring-shaped magnet 64 which is a permanent magnet is integrally formed with upper drum 52. Stator 62 consists of a ring-shaped base 62a having a predetermined radius, a plurality of partitions 62b which separate outer periphery portion of ring-shaped base 62a at a regular interval, and a plurality of coil winding plates 62d protrusively formed between the partitions, around which coils 62c are wound several times. In order to apply current to the coils on each coil winding plate 62d, an electric wire drawn out from a printed circuit board runs through electric wire inserting hole 60a formed in fixing boss 60 and connects to base 62a.

Fixing boss 60 is inserted into fixing boss inserting holes 70d, 70c, 70a and 70b respectively formed at the centers of lower drum 58, lower rotary transformer 68, upper rotary transformer 70 and stator 62. The upper end portion of fixing boss 60 is inserted into fixing boss inserting hole 70b formed at the center of stator 62, and the lower end portion thereof is inserted into fixing boss inserting hole 70d formed at the center of lower drum 58.

Above stator 62 and at the inner portion of upper drum 52, a circular magnet 66 is formed. Ring-shaped magnet 64 positioned around the stator and circular magnet 66 are formed by alternately magnetizing N-pole and S-pole at a regular interval. The two magnets are installed such that opposite polarities of the magnets are vertically facing each other on the same line. That is, the magnets are installed as the N-pole of circular magnet 66 corresponds the S-pole of ring-shaped magnet 64, as shown in FIG. 3.

Figure 4:
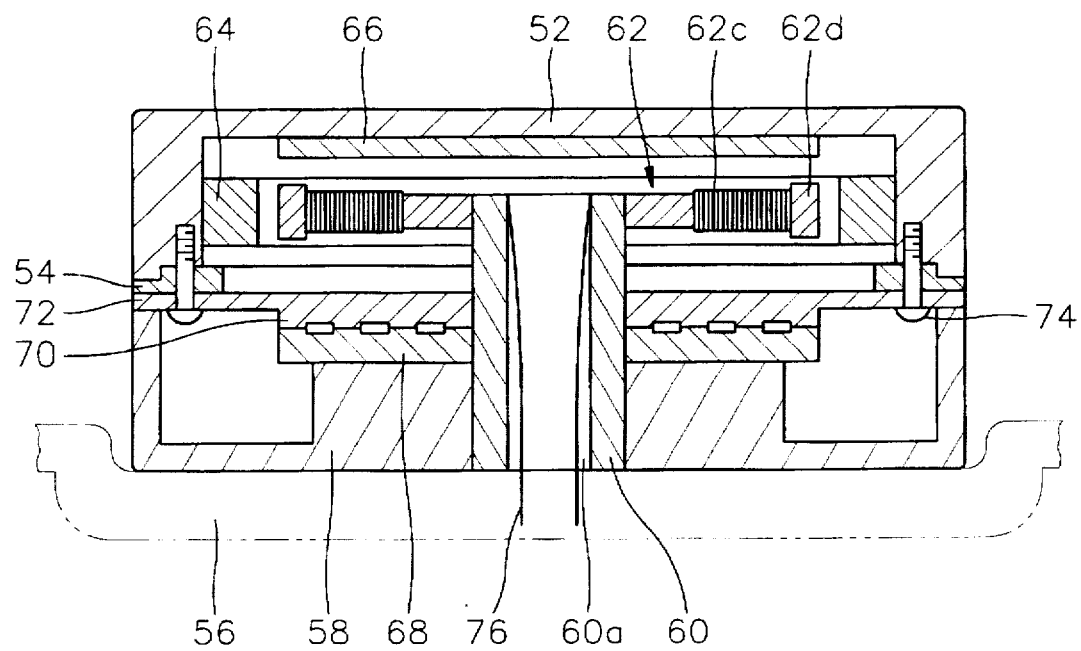
FIG. 4 is a cross sectional view of an assembled rotary head drum consisting of each of the elements shown in FIG. 3.

FIG. 4 is a cross sectional view of an assembled rotary head drum consisting of each of the elements shown in FIG. 3.

In upper drum 52, circular magnet 66 having the N-pole and the S-pole magnetized at a regular interval is installed at the upper portion. Below circular magnet 66, stator 62 combined with the upper portion of fixing boss 60 protruded from the center of lower drum 58 is positioned, and around stator 62 and along the inner circumference of upper drum 52, ring-shaped magnet 64 having the N-pole and the S-pole magnetized at a regular interval is fixedly installed. At the outer end portion of upper drum 52, video head 54 for reading information from or recording information on a magnetic tape, is provided between circular supporting plate 72 and upper drum 52 by screw 74 and screw groove 51 formed at the bottom portion of upper drum 52.

In the lower drum, lower rotary transformer 68 electrically connected with the printed circuit board, is provided. Under circular supporting plate 72, upper rotary transformer 70 for applying signals from video head 54 to lower rotary transformer 68 and for applying signals from lower rotary transformer 68 to video head 54, is installed. At the center portion of head drum 50, fixing boss 60 having electric wire inserting hole 60a at the center portion thereof is disposed so that it extends from lower drum 58 to stator 62. A wire 76 drawn out from the printed circuit board is connected to stator 62 through electric wire inserting hole 60a to apply current into stator 62. Under lower drum 58, a drum base 56 having a predetermined inclination is installed on a main base.

The head drum having the above-mentioned constitution operates as follows.

First, a cassette is loaded onto a supply reel and a take-up reel on a main base. Then, the magnetic tape is drawn out by a supply side slant pole assembly and a take-up side slant pole assembly so that it is loaded onto a head drum. At this state, when a user presses a play mode switch or a recording mode switch, the tape is drawn from the supply reel toward the take-up reel at a constant velocity according to the running mechanism. At the same time, current is supplied to stator 62 to transform the stator into an electromagnet. By the electromagnetic force generated between ring-shaped magnet 64 provided in upper drum 52 and stator 62, upper drum 52 starts to rotate in a predetermined direction, and by the electromagnetic force generated between circular magnet 66 provided in an upper inner portion of upper drum 52 with stator 62, upper drum 52 rises to some degree. Then, video head 54 provided at the lower portion of upper drum 52, reads information recorded on the tape running around upper and lower drums 52 and 58, or records new information onto the tape.

Once video head 54 reads the information recorded on the tape, signals are supplied to upper rotary transformer 70 formed under circular supporting plate 72. The supplied signals are transmitted to lower rotary transformer 68 formed in lower drum 58 and then to a preamplifier on the printed circuit board by a signal connection line. After that, the signals are reproduced on a monitor by a known method.

Figure 5:
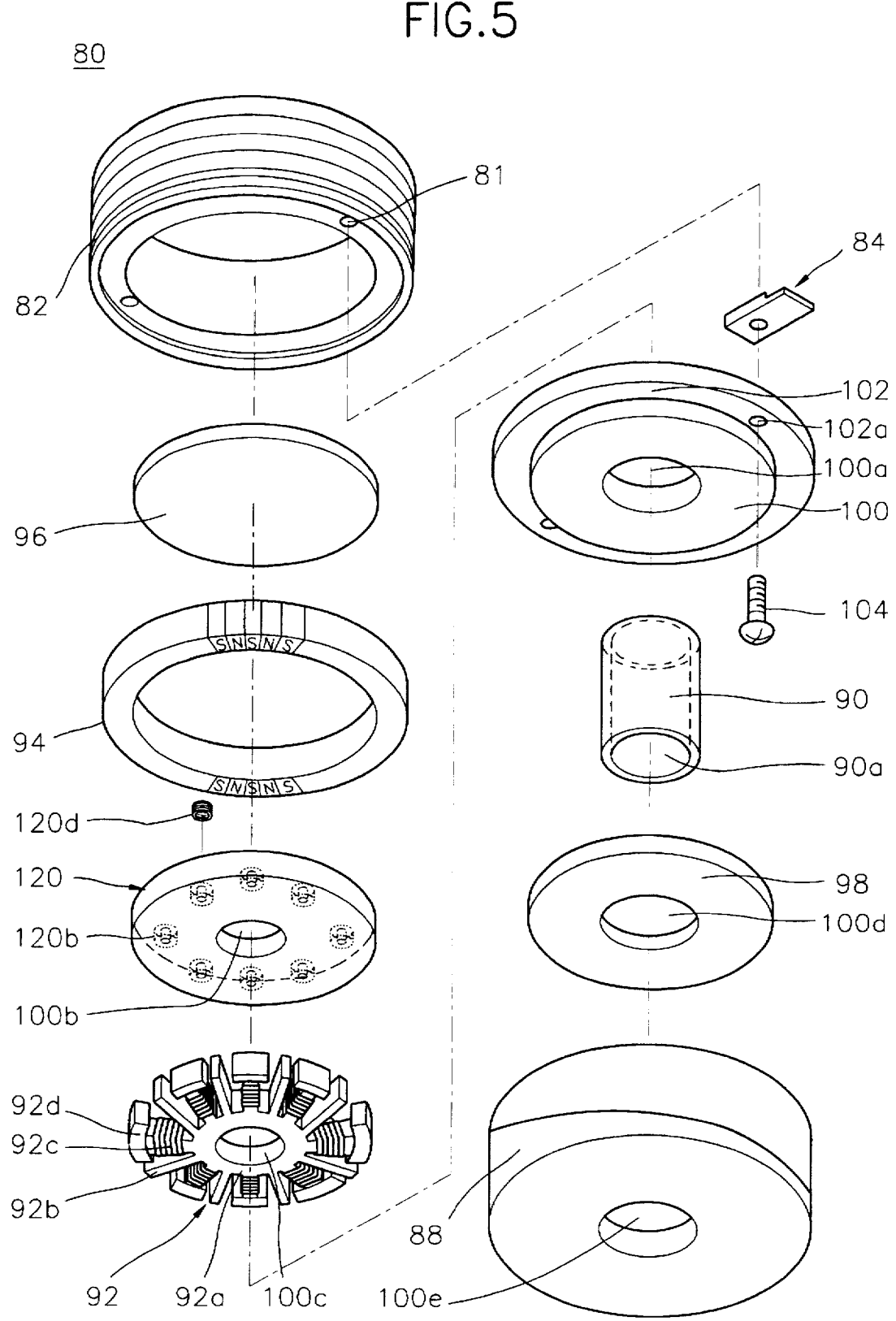
FIG. 5 is an exploded perspective view of a rotary head drum for a VCR according to another embodiment of the present invention.

FIG. 5 is an exploded perspective view of a rotary head drum for a VCR according to another embodiment of the present invention.

As shown in FIG. 3, the schematic structure of a head drum 80 will be described below. At the upper portion, a cylindrical upper drum 82 having a screw groove 81 formed thereunder is installed. A plurality of video heads 84 are provided at the lower end portion of upper drum 82. A lower drum 88 for determining the installation position of upper drum 82, is provided on the same vertical line as upper drum 82 and at the lower portion of head drum 80. From the center portion of lower drum 88, a fixing boss having a certain height is disposed at the center portion of upper drum 82. A stator 92 which can be transformed into an electromagnet according to an application of current, is provided at the upper end portion of fixing boss 90 and a ring-shaped magnet 94 integrally formed with upper drum 82, is provided around stator 92 at the same height with stator 92. A circular magnet 96 is fixedly installed above stator 92 and a circular coil magnet plate 120 controlled by a separate servo system is installed between stator 92 and circular magnet 96. At the upper portion in lower drum 88, a lower rotary transformer 98 is installed, and at the corresponding lower portion in upper drum 82, an upper rotary transformer 100 for transmitting signals from video head 84 to lower rotary transformer 98 is installed.

At the center portion of fixing boss 90, an electric wire inserting hole 90a for supplying current from a printed circuit board to stator 92 and to circular coil magnet plate 120, is formed. Stator 92 consists of a ring-shaped base 92a having a predetermined radius, a plurality of partitions 92b for separating the outer periphery of base 92a at a regular interval, and a coil winding plate 92d protrusively formed between partitions 92b. The coil winding plate is wound with a coil 92c. In order to supply current to coil 92c on coil winding plate 92d, a wire drawn out from the printed circuit board runs through electric wire inserting hole 90a formed in fixing boss 90 and connects to base 92a.

Ring-shaped magnet 94 is formed by alternately magnetizing the N-pole and the S-pole, and circular magnet 96 is formed as a magnet having an N-polarity or an S-polarity. Circular magnet 96 also can be formed by alternately magnetizing the N-pole and the S-pole. At this time, opposite polarities of the two magnets face each other on the same vertical line.

Video head 84 is fixed on circular supporting plate 102 having a fixing boss inserting hole 100a at the center portion thereof by a screw 104, a screw hole 102a formed at the periphery portion of circular supporting plate 102, and screw groove 81 formed at the bottom portion of upper drum 82. Upper rotary transformer 100 is integrally formed under circular supporting plate 102, rotates with upper drum 82 and is electrically connected with lower rotary transformer 98 fixed on lower drum 88.

Circular coil magnet plate 120 has a fixing boss inserting hole 100b at the center portion and intaglio grooves 120b on the upper and periphery portion thereof. In each intaglio groove 120b, a ring-shaped coil 120d which can be transformed into an electromagnet when current is applied, is inserted. The number of intaglio grooves 120b and the number of ring-shaped coils 120d are the same as the number of poles on circular magnet 96.

Fixing boss 90 is inserted into fixing boss inserting holes 100e, 100d, 100a, 100c and 100b respectively formed at the center portions of lower drum 88, lower rotary transformer 98, upper rotary transformer 100, stator 92 and coil magnet plate 120. The upper end portion of fixing boss 90 is positioned in fixing boss inserting hole 100b formed in coil magnet plate 120 and the lower end portion of fixing boss 90 is positioned in fixing boss inserting hole 100e formed in lower drum 88.

Figure 6:
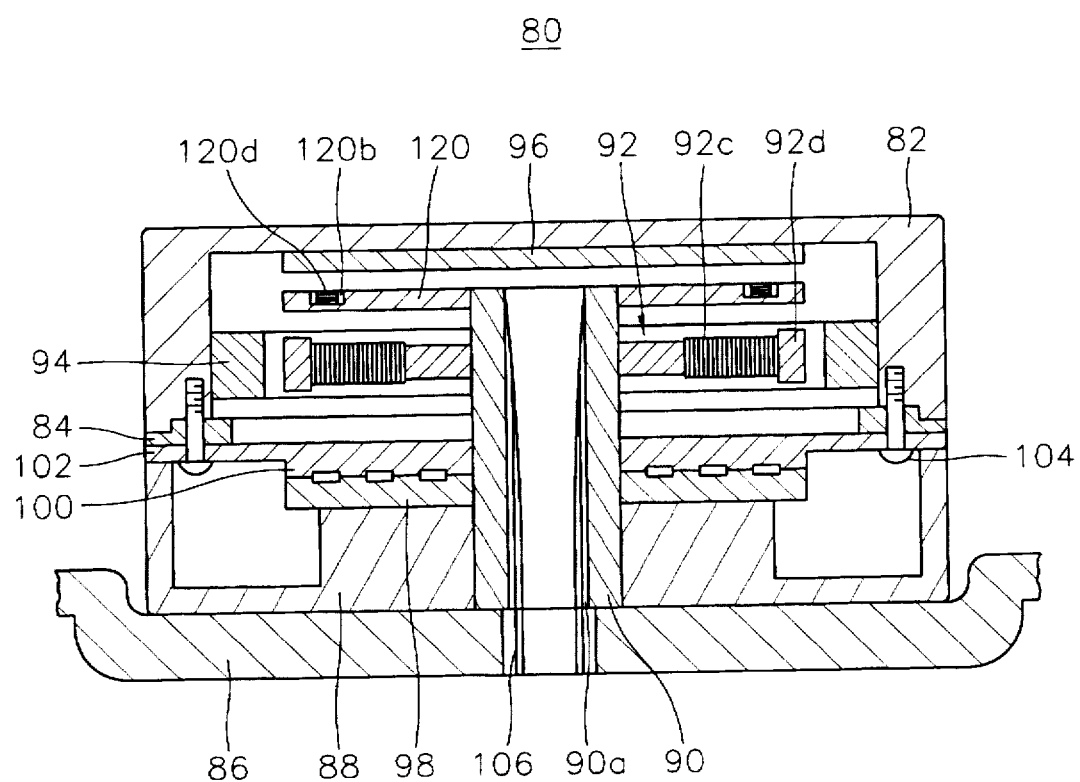
FIG. 6 is a cross sectional view of an assembled rotary head drum consisting of each of the elements shown in FIG. 5.

FIG. 6 is a cross sectional view of an assembled rotary head drum consisting of each of the elements shown in FIG. 5.

In upper drum 82, circular magnet 96 having N-pole or S-pole magnetized, is installed at the upper portion. Below circular magnet 96, coil magnet plate 120 combined with the upper end portion of fixing boss 90 protruding from the center of lower drum, is provided. Stator 92 is positioned under coil magnet plate 120, and around stator 92 and along the inner circumference of upper drum 82, ring-shaped magnet 94 having N-pole and S-pole magnetized at a regular interval is fixedly installed. At the outer end portion of upper drum 82, video head 84 for reading information from or recording information onto a magnetic tape, is provided between circular supporting plate 102 and upper drum 82 by screw 104, screw hole 102a and screw groove 81 formed at the bottom portion of upper drum 82.

In the lower drum, lower rotary transformer 98 which is electrically connected with the printed circuit board, is provided. Under circular supporting plate 102, upper rotary transformer 100 for supplying signals from video head 84 to lower rotary transducer 98 and for supplying signals from lower rotary transformer 98 to video head 84, is installed. At the center portion of head drum 80, fixing boss 90 having electric wire inserting hole 90a at the center portion thereof is disposed so that it extends from lower drum 88 to coil magnet plate 120. A wire 106 drawn out from the printed circuit board runs through electric wire inserting hole 90a and connects to stator 92 and to circular coil magnet plate 120 to supply current into stator 92 and coil magnet plate 120. Under lower drum 88, a drum base 86 having a predetermined inclination is installed on a main base.

The head drum having the above-mentioned constitution operates as follows.

After loading a cassette, if a user presses a play mode switch or a recording mode switch, the tape is drawn from a supply reel toward a take-up reel at a constant velocity according to a running mechanism. At the same time, current is applied to stator 92 and to coil magnet plate 120 to transform them into electromagnets. By the electromagnetic force generated between ring-shaped magnet 94 provided in upper drum 82 and stator 92, upper drum 82 starts to rotate in a predetermined direction. And by the electromagnetic force generated between circular magnet 96 provided in and upper portion of upper drum 82 and coil magnet plate 120, upper drum 82 rises to a certain degree. Then, video head 84 provided at the lower portion of upper drum 82 reads information recorded on the tape running around upper and lower drums 82 and 88, or records new information onto the tape.

At this time, the intensity of the applied current into ring-shaped coil 120d on circular coil magnet plate 120 can be controlled by a separately provided servo system. Accordingly, the intensity of the force acting between circular magnet 96 under upper drum 82 and coil magnet plate 120 can be partially differentiated. Therefore, upper drum can tilt to the right, the left, the front and the rear during rotation.

Once video head 84 reads the information recorded on the tape, the signals are supplied into upper rotary transformer 100 integrally formed under circular supporting plate 102. The supplied signals are transmitted to lower rotary transformer 98 fixedly formed in lower drum 88, and then to a pre-amplifier on the printed circuit board by a signal connection line. After that, the signals are reproduced on a monitor by a known method.

In this embodiment, since the rotational motion of the upper drum can be controlled by the electromagnetic force generated from the circular coil magnet plate which can be controlled by the separate servo system, the video head can be more accurately adjusted to the recording surface of the tape.

As described above, the upper drum of the head drum according to the present invention rotates not by a drum shaft, but by the electromagnetic forces generated between the magnets and the electromagnets. Accordingly, insertion process of the drum shaft into the upper drum during the manufacturing of the head drum can be eliminated to simplify the manufacturing process. Moreover, since the rotation of the upper drum is not carried out by the mechanical rotation of a drum shaft, the noise generated during the rotation of the upper drum can be reduced. Further, since the rotational motion of the upper drum can be advantageously controlled, the video head can be more accurately adjusted to the recording surface of the tape so that a high quality of recording and playing can be obtained.

Although the preferred embodiments of the invention have been described, it is understood that the present invention should not be limited to these preferred embodiments, but various changes and modifications can be made by one skilled in the art within the spirit and scope of the invention as hereinafter claimed.

What is claimed is:

1. A rotary head drum for a video cassette recorder comprising:

a cylindrical lower drum;

an upper drum installed on said lower drum and rotatably supported by said lower drum;

at least two video heads provided at an outer lower portion of said upper drum for recording or playing a video signal from a magnetic tape;

a lower rotary transformer formed in an upper portion of said lower drum;

an upper rotary transformer positioned above said lower rotary transformer for transmitting an applied signal from said video head to said lower rotary transformer;

a stator positioned on said upper rotary transformer, said stator being transformed into an electromagnet according to an application of current;

a ring-shaped magnet integrally formed in said upper drum, said ring-shaped magnet being formed by alternately magnetizing N-pole and S-pole at a regular interval; and a circular magnet formed above said stator and in said upper drum, said circular magnet being formed by alternately magnetizing N-pole and S-pole at the regular interval.

2. A rotary head drum for a video cassette recorder as claimed in claim 1, wherein said ring-shaped magnet and said circular magnet are installed so that opposite polarities of said ring-shaped magnet and said circular magnet face each other vertically on the same line.

3. A rotary head drum for a video cassette recorder as claimed in claim 1, wherein said stator comprises a ring-shaped base having a predetermined radius, a plurality of partitions for separating a periphery portion of said base at a regular interval, and a coil winding plate protrusively formed between said partitions for winding a coil.

4. A rotary head drum for a video cassette recorder as claimed in claim 1, wherein a circular supporting plate having a screw hole at a periphery portion thereof is integrally formed on said upper rotary transformer, and said video head is provided between said circular supporting plate and said upper drum by a screw.

5. A rotary head drum for a video cassette recorder as claimed in claim 4, wherein fixing boss inserting holes are formed at center portions of said stator, said circular supporting plate, said upper rotary transformer, said lower rotary transformer and said lower drum, and a fixing boss having an electric wire inserting hole at a center thereof is inserted into said fixing boss inserting holes.

6. A rotary head drum for a video cassette recorder comprising:

a cylindrical lower drum;

an upper drum installed on said lower drum and rotatably supported by said lower drum;

at least two video heads provided at an outer lower portion of said upper drum for recording or playing a video signal from a magnetic tape;

a lower rotary transformer formed in an upper portion of said lower drum;

an upper rotary transformer positioned on said lower rotary transformer for transmitting an applied signal from said video head to said lower rotary transformer;

a stator positioned above said upper rotary transformer, said stator being transformed into an electromagnet according to an application of current;

a ring-shaped magnet integrally formed in said upper drum;

a coil magnetic plate formed on said stator; and a circular magnet fixedly formed above said stator and in said upper drum.

7. A rotary head drum for a video cassette recorder as claimed in claim 6, wherein a plurality of intaglio grooves are formed at an outer periphery of said coil magnet plate, and ring-shaped coils are inserted into said intaglio grooves, said ring-shaped coils being transformed into electromagnets by current.

8. A rotary head drum for a video cassette recorder as claimed in claim 7, wherein said ring-shaped magnet is formed by alternately magnetizing N-pole and S-pole at a regular interval.

9. A rotary head drum for a video cassette recorder as claimed in claim 8, wherein said circular magnet is formed by magnetizing N-pole.

10. A rotary head drum for a video cassette recorder as claimed in claim 8, wherein said circular magnet is formed by magnetizing S-pole.

11. A rotary head drum for a video cassette recorder as claimed in claim 8, wherein a number of said intaglio grooves and poles formed on said circular magnet are the same.

12. A rotary head drum for a video cassette recorder as claimed in claim 7, wherein said stator comprises a ring-shaped base having a predetermined radius, a plurality of partitions for separating a periphery portion of said base at a regular interval, and a coil winding plate protrusively formed between said partitions for winding a coil.

13. A rotary head drum for a video cassette recorder as claimed in claim 6, wherein a circular supporting plate having a screw hole at a periphery portion thereof is integrally formed on said upper rotary transformer, and said video head is provided between said circular supporting plate and said upper drum by a screw.

14. A rotary head drum for a video cassette recorder as claimed in claim 13, wherein fixing boss inserting holes are formed at center portions of said coil magnet plate, said stator, said circular supporting plate, said upper rotary transformer, said lower rotary transducer and said lower drum, and a fixing boss having an electric wire inserting hole at a center thereof is inserted into said fixing boss inserting holes.

15. A rotary head drum for a video cassette recorder comprising:

a cylindrical lower drum;

an upper drum installed on said lower drum and rotatably supported by said lower drum;

at least two video heads provided at an outer lower portion of said upper drum for recording or playing a video signal from a magnetic tape;

a lower rotary transformer formed in an upper portion of said lower drum;

an upper rotary transformer positioned on said lower rotary transformer for transmitting an applied signal from said video head to said lower rotary transformer;

a circular supporting plate integrally formed on said upper rotary transformer, said circular supporting plate being provided with a screw hole at an outer periphery portion thereof;

a stator positioned on said circular supporting plate, said stator being transformed into an electromagnet according to an application of current and comprising a ring-shaped base having a predetermined radius, a plurality of partitions for separating a periphery portion of said base at a regular interval, and a coil winding plate protrusively formed between said partitions for winding a coil;

a ring-shaped magnet integrally formed in said upper drum, said ring-shaped magnet being formed by magnetizing N-pole and S-pole alternately at a regular interval; and a circular magnet formed above said stator and in said upper drum, said circular magnet being formed by magnetizing N-pole and S-pole alternately at a regular interval, wherein said ring-shaped magnet and said circular magnet are installed so that opposite polarities of said ring-shaped magnet and said circular magnet face each other vertically on the same line, and wherein fixing boss inserting holes are formed at center portions of said coil magnet plate, said stator, said circular supporting plate, said upper rotary transformer, said lower rotary transformer and said lower drum, and a fixing boss having an electric wire inserting hole at a center thereof is inserted into said fixing boss inserting holes.

16. A rotary head drum for a video cassette recorder comprising:

a cylindrical lower drum;

an upper drum installed on said lower drum and rotatably supported by said lower drum;

at least two video heads provided at an outer lower portion of said upper drum for recording or playing a video signal from a magnetic tape;

a lower rotary transformer formed in an upper portion of said lower drum;

an upper rotary transformer positioned on said lower rotary transformer for transmitting an applied signal from said video head to said lower rotary transformer;

a circular supporting plate integrally formed on said upper rotary transformer, said circular supporting plate being provided with a screw hole at an outer periphery portion thereof;

a stator positioned on said upper rotary transformer, said stator being transformed into an electromagnet according to an application of current and comprising a ring-shaped base having a predetermined radius, a plurality of partitions for separating a periphery portion of said base at a regular interval, and a coil winding plate protrusively formed between said partitions for winding a coil;

a ring-shaped magnet integrally formed in said upper drum, said ring-shaped magnet being formed by magnetizing N-pole and S-pole alternately at a regular interval;

a circular coil magnet plate formed on said stator and controlled by a separate servo system, said circular coil magnet plate being provided with a plurality of intaglio grooves formed at an outer periphery of said coil magnet plate, and ring-shaped coils being inserted into said intaglio grooves and being transformed into electromagnets by current; and a circular magnet fixedly formed above said stator and in said upper drum, said circular magnet being formed by magnetizing N-pole or S-pole, wherein the number of said intaglio grooves and the number of poles formed on said circular magnet are the same, and wherein fixing boss inserting holes are formed at center portions of said coil magnet plate, said stator, said circular supporting plate, said upper rotary transformer, said lower rotary transformer and said lower drum, and a fixing boss having an electric wire inserting hole at a center thereof is inserted into said fixing boss inserting holes.

* * * * *